(12) United States Patent
Shufflebotham

(10) Patent No.: US 8,710,350 B2
(45) Date of Patent: Apr. 29, 2014

(54) COMBINATION PHOTOVOLTAIC AND WIND POWER GENERATION INSTALLATION

(76) Inventor: Paul Shufflebotham, San Jose, CA (US)

( * ) Notice: Subject to any disclaimer, the term of this patent is extended or adjusted under 35 U.S.C. 154(b) by 235 days.

(21) Appl. No.: 13/091,989

(22) Filed: Apr. 21, 2011

(65) Prior Publication Data

US 2012/0267901 A1  Oct. 25, 2012

(51) Int. Cl.
*H02N 6/00* (2006.01)
(52) U.S. Cl.
USPC .............................. 136/244; 290/55
(58) Field of Classification Search
USPC ........................................ 290/44, 55
See application file for complete search history.

(56) References Cited

U.S. PATENT DOCUMENTS

| | | | | | |
|---|---|---|---|---|---|
| 996,334 | A | * | 6/1911 | Haskins | 290/4 C |
| 3,487,229 | A | * | 12/1969 | Krausz | 307/71 |
| 7,045,702 | B2 | * | 5/2006 | Kashyap | 136/244 |
| 7,199,470 | B2 | * | 4/2007 | Bogner et al. | 257/734 |
| 7,453,167 | B2 | * | 11/2008 | Gilbert | 290/55 |
| 7,888,590 | B2 | * | 2/2011 | Niederer | 136/251 |
| 8,288,884 | B1 | * | 10/2012 | Malcolm | 290/55 |
| 2004/0183307 | A1 | * | 9/2004 | Yoshida et al. | 290/44 |
| 2006/0054210 | A1 | * | 3/2006 | Proisy et al. | 136/244 |
| 2006/0260672 | A1 | * | 11/2006 | Niederer | 136/251 |
| 2009/0079161 | A1 | * | 3/2009 | Muchow et al. | 280/400 |
| 2009/0130607 | A1 | * | 5/2009 | Slafer | 430/323 |
| 2009/0159118 | A1 | * | 6/2009 | Kalkanoglu et al. | 136/251 |
| 2009/0178668 | A1 | * | 7/2009 | Boggavarapu | 126/601 |
| 2009/0186745 | A1 | * | 7/2009 | Lewiston | 482/2 |
| 2010/0215902 | A1 | * | 8/2010 | Kiehne et al. | 428/141 |
| 2011/0290296 | A1 | * | 12/2011 | Daniel et al. | 136/244 |
| 2013/0008482 | A1 | * | 1/2013 | Stancel et al. | 136/244 |
| 2013/0015710 | A1 | * | 1/2013 | Rotzoll et al. | 307/52 |
| 2013/0302627 | A1 | * | 11/2013 | Roehrig et al. | 428/447 |

FOREIGN PATENT DOCUMENTS

FR    2574863 A1 * 6/1986

* cited by examiner

*Primary Examiner* — Joseph Waks
(74) *Attorney, Agent, or Firm* — Chris R. Schmidt

(57) ABSTRACT

A combination photovoltaic and wind power generation installation comprising at least one wind turbine and a plurality of photovoltaic arrays, wherein the photovoltaic arrays may be disposed around the at least one wind turbine such that the photovoltaic arrays are at least partially shaded a portion of the day by the shadow cast by the at least one wind turbine. Photovoltaic modules that are resistant to shading effects may be used to minimize the effects of shading by the at least one wind turbine. The combination photovoltaic and wind power generation installation may transmit power through a single transmission line.

2 Claims, 12 Drawing Sheets

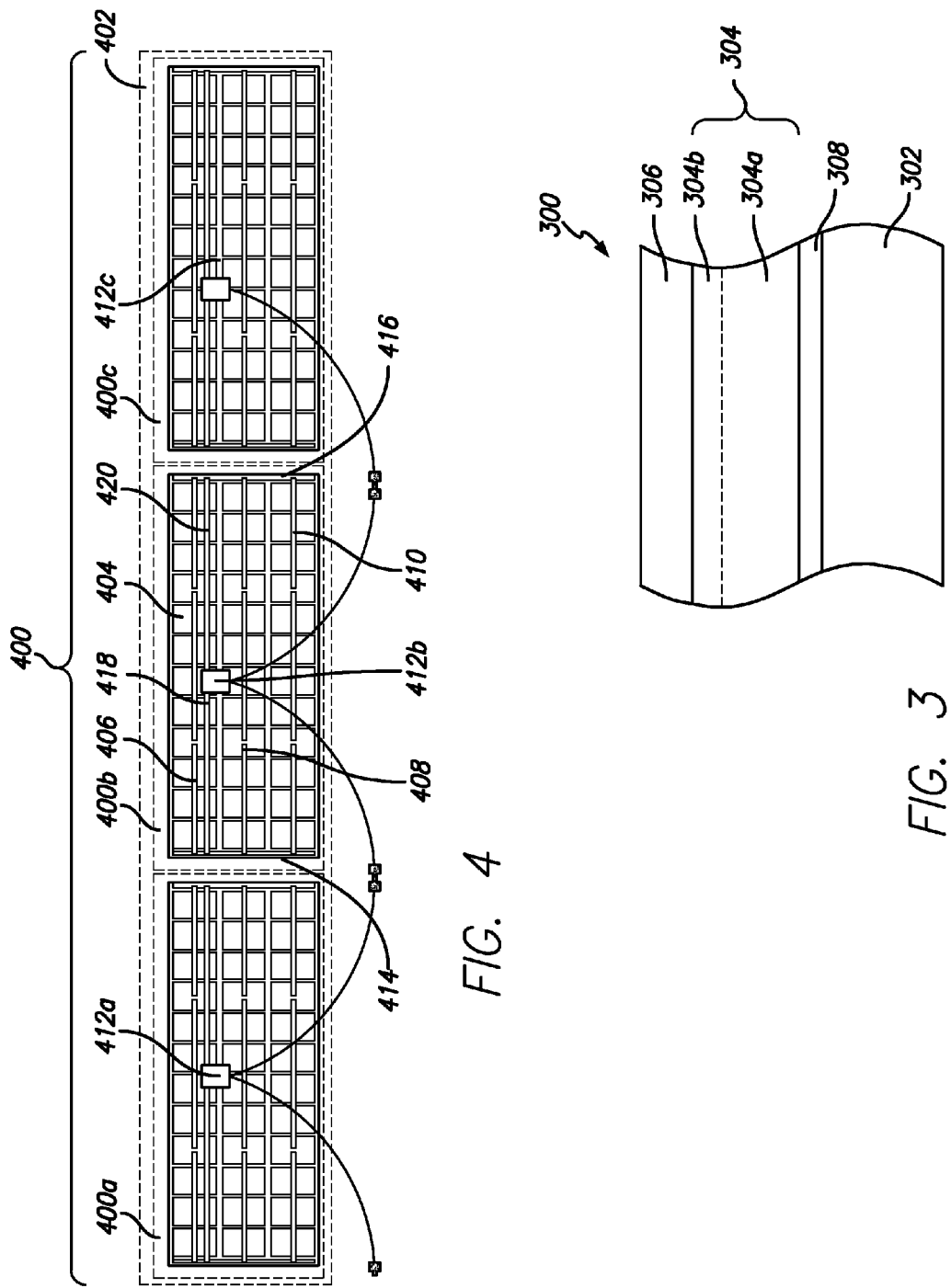

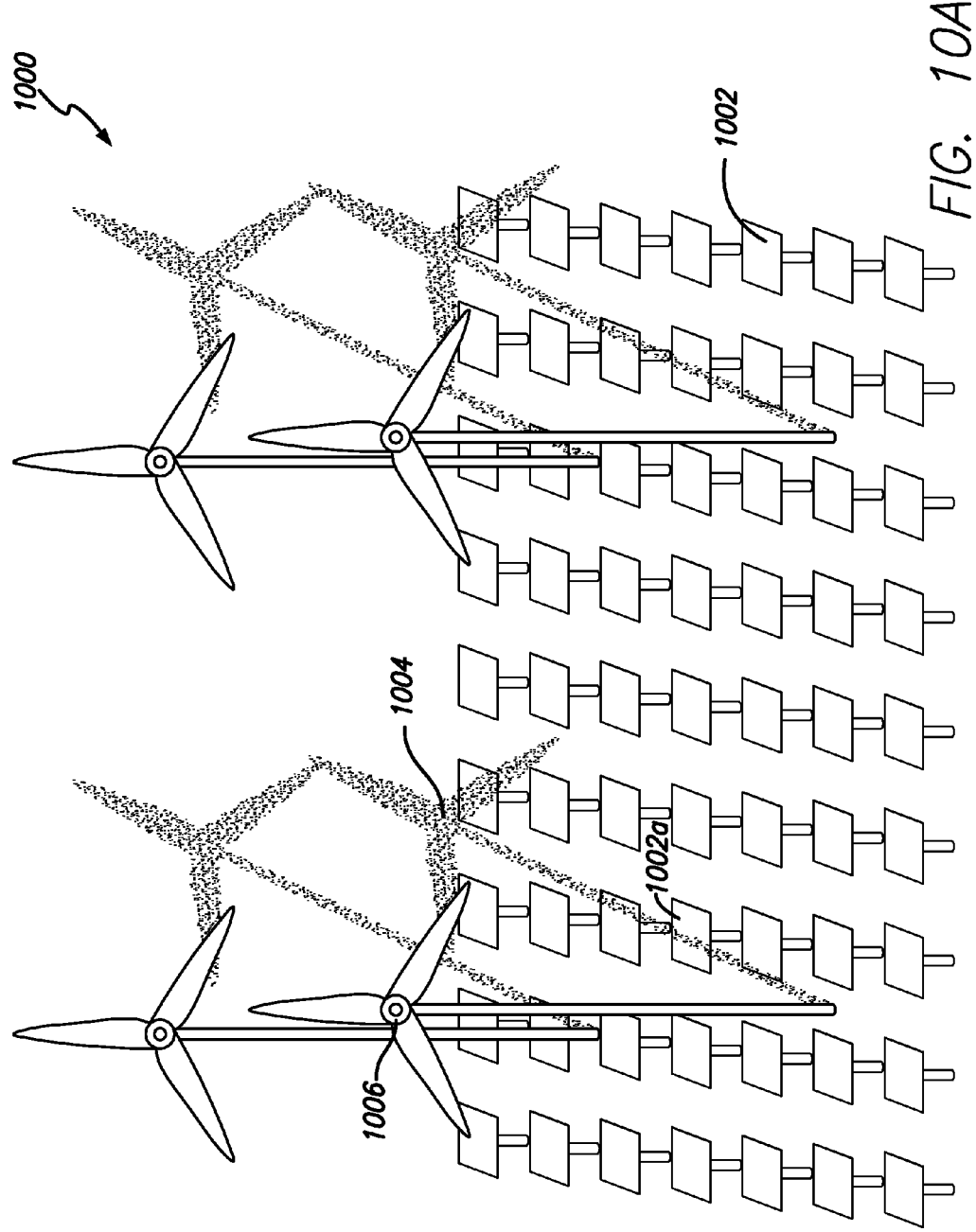

COMBINATION PHOTOVOLTAIC AND WIND POWER GENERATION INSTALLATION

FIELD OF THE INVENTION

The present invention relates generally to the field of photovoltaic modules and wind turbines, and specifically to combining photovoltaic modules and wind turbines to provide spatially efficient power generation installations.

BACKGROUND OF THE INVENTION

Photovoltaic installations and wind farms have gained popularity as alternative methods of power generation. Recent efforts in the search for suitable sources of renewable energy as substitutions for more archaic sources of power generation such as the burning of coal, petroleum, and natural gas has placed both photovoltaic power and wind power in the forefront of technological research.

SUMMARY OF SPECIFIC EMBODIMENTS

One embodiment of the invention provides a combination photovoltaic and wind power generation installation comprising at least one wind turbine configured to generate power and a plurality of photovoltaic arrays, wherein the photovoltaic arrays are at least partially shaded a portion of the day by a shadow cast by the at least one wind turbine.

Another embodiment of the present invention provides a method of operating a combination photovoltaic and wind power generation installation comprising providing at least one wind turbine configured to generate power, providing a plurality of photovoltaic arrays configured to generate power, and installing the photovoltaic arrays such that the photovoltaic arrays are at least partially shaded a portion of the day by a shadow cast by the at least one wind turbine.

Another embodiment of the invention provides a combination photovoltaic and wind power generation installation comprising a plurality of wind turbines configured to generate power and a plurality of photovoltaic arrays configured to generate power wherein the plurality of photovoltaic arrays are at least partially shaded a portion of the day by a shadow cast by at least one of the plurality of wind turbines.

BRIEF DESCRIPTION OF THE DRAWINGS

FIG. 3 is a cross-sectional view of an example of a photovoltaic cell.

FIG. 4 is a plan view of a photovoltaic array.

FIG. 10A is a perspective view of a combination photovoltaic and wind power generation installation.

Figure 1:
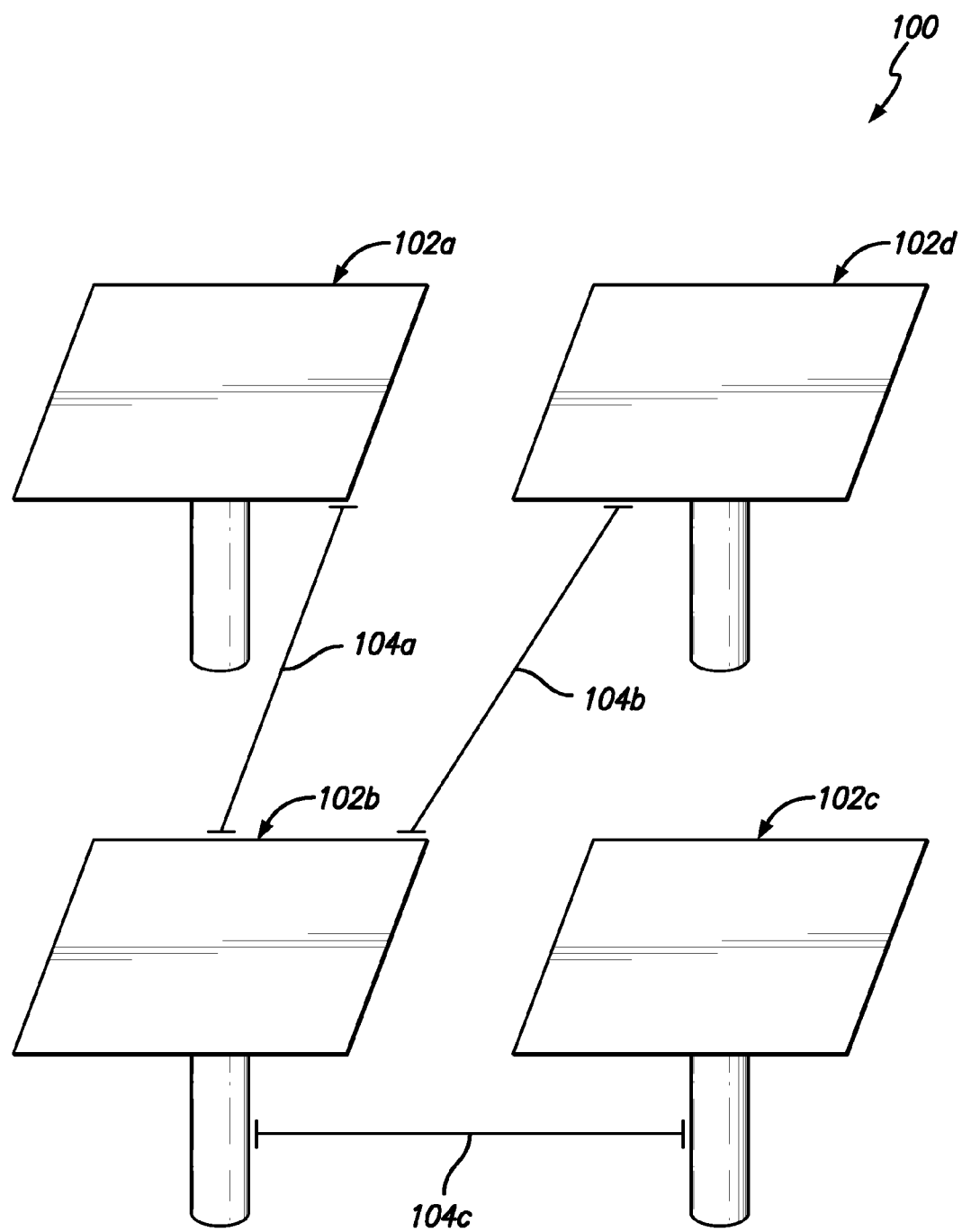
FIG. 1 is a perspective view of an example of a conventional photovoltaic power generation installation.
Figure 1B:
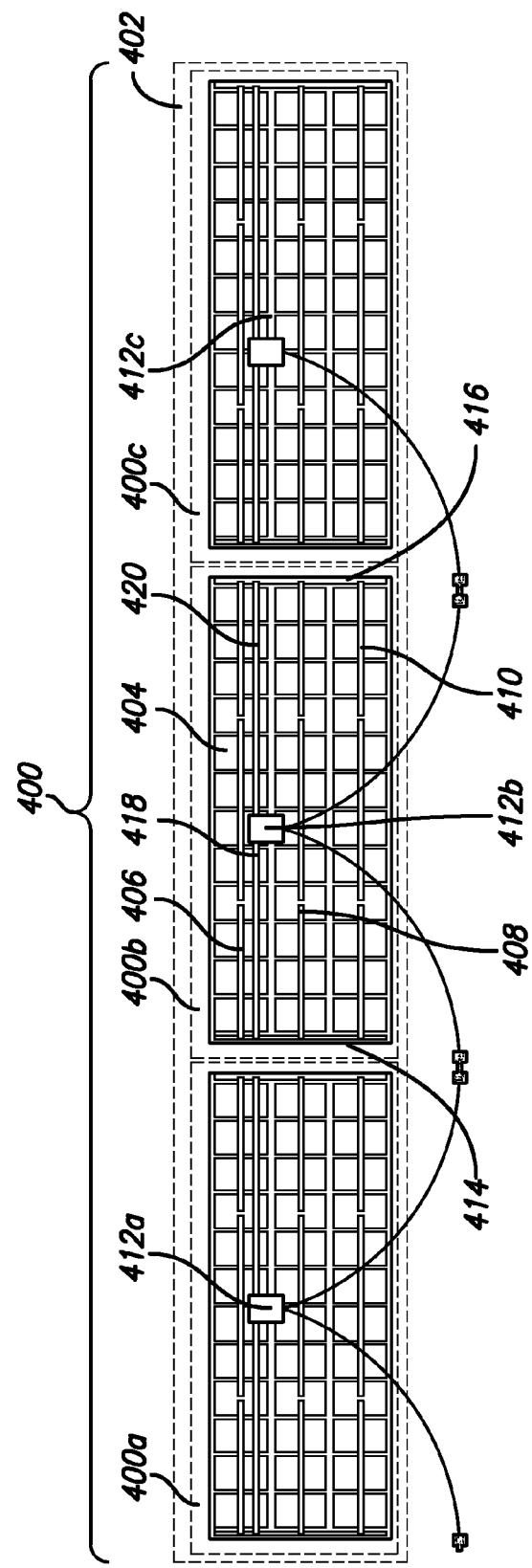

It should be recognized that figures are not intended to be drawn to scale.

DETAILED DESCRIPTION OF PREFERRED EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

As indicated above, embodiments of the invention relate to combination photovoltaic and wind power generation installations. Photovoltaic technology and wind power generation technology have become the focus of renewable energy research endeavors throughout the world in hopes of developing sources of sustainable energy that can alleviate at least some reliance on fossil fuels such as coal, petroleum, and natural gas. While large-scale photovoltaic installations and large-scale wind farms have been employed for production of utility-scale power, conventional photovoltaic modules and conventional wind turbines both have significant disadvantages when assembled into installations large enough to generate utility-scale power.

In order to provide cost-efficient power on a scale large enough to occupy a notable portion of the energy grid, many photovoltaic modules are strung together in continuous arrays which are further assembled into power generation installations. Large-scale installations require vast amounts of space and are typically disposed in large, open areas such as open fields, deserts, and mountaintops.

The large amounts of space required to accommodate the numbers of modules in such installations is further exacerbated by the large amounts of space required between photovoltaic arrays. For many conventional photovoltaic modules any amount of shading could prove to be detrimental to the power output of a module and potentially an entire photovoltaic array. The detrimental effects caused by shading of photovoltaic cells of a photovoltaic module, often referred to as shading effects, are a result of a decrease in insulation which reduces photocurrent in the cell. In a series connection, photocurrent is reduced in all of the cells in the series. If the entire module comprises a single series of cells, this can lead to decommissioning of the entire module and potentially an entire string of photovoltaic modules. Shading effects make it necessary to assure that conventional photovoltaic arrays are disposed a sufficient distance from one another and from other surrounding objects to avoid all shading. Particularly, for conventional thin-film photovoltaic modules, even partial shading of a cell may lead to decommission of an entire module and potentially an entire series of modules.

The need to provide sufficient space around the arrays to avoid shading of any portion of the arrays by one another, and by surrounding objects, may be further exacerbated by the range of motion required by photovoltaic arrays comprising solar tracking mechanisms. In order to maximize a photovoltaic module's exposure to the sun, it is often desirable to employ tracking equipment capable of positioning photovoltaic arrays relative to the position of the sun in response to changes in the angles of the sun's rays relative to the light-incident side of the module throughout the day as well as over the year.

FIG. 1 is a perspective view of an example of a conventional photovoltaic power generation installation 100 comprising photovoltaic arrays 102a-102d. Photovoltaic arrays 102a-102d comprise at least one photovoltaic module and are disposed sufficient distances 104a-c from one another so as to avoid contact with one another and shading of one another during rotation and angling of the arrays during solar tracking. The space surrounding the conventional photovoltaic power generation installation 100 must also be large enough so as to avoid shading of the modules by external objects such as trees and power lines.

The large spatial requirements necessitated by the use of conventional photovoltaic arrays in large-scale installations, both between the arrays and around them, result in large amounts of unused space. Providing photovoltaic modules that are substantially immune to shading effects would allow photovoltaic arrays to be disposed more closely to one another and could allow other objects to be placed around and among photovoltaic arrays, such as other power generation apparatuses (e.g. wind turbines).

Wind turbines, also called wind generators, wind power units, wind energy converters, and aerogenerators also require large amounts of space. Wind turbines are conventionally disposed at least three to five rotor diameters apart in a direction that is perpendicular to the direction of the prevailing wind and at least five to ten rotor diameters apart in a direction that is parallel to the direction of the prevailing wind. Such separation allows avoidance of efficiency loss caused by the "wind park effect" wherein mutual interference is experienced among the turbines due to the turbulence produced by the turbines' rotors. These spatial requirements result in wind-power generation installations occupying large amounts of overall space with only a small fraction of the ground region being occupied.

Figure 2:
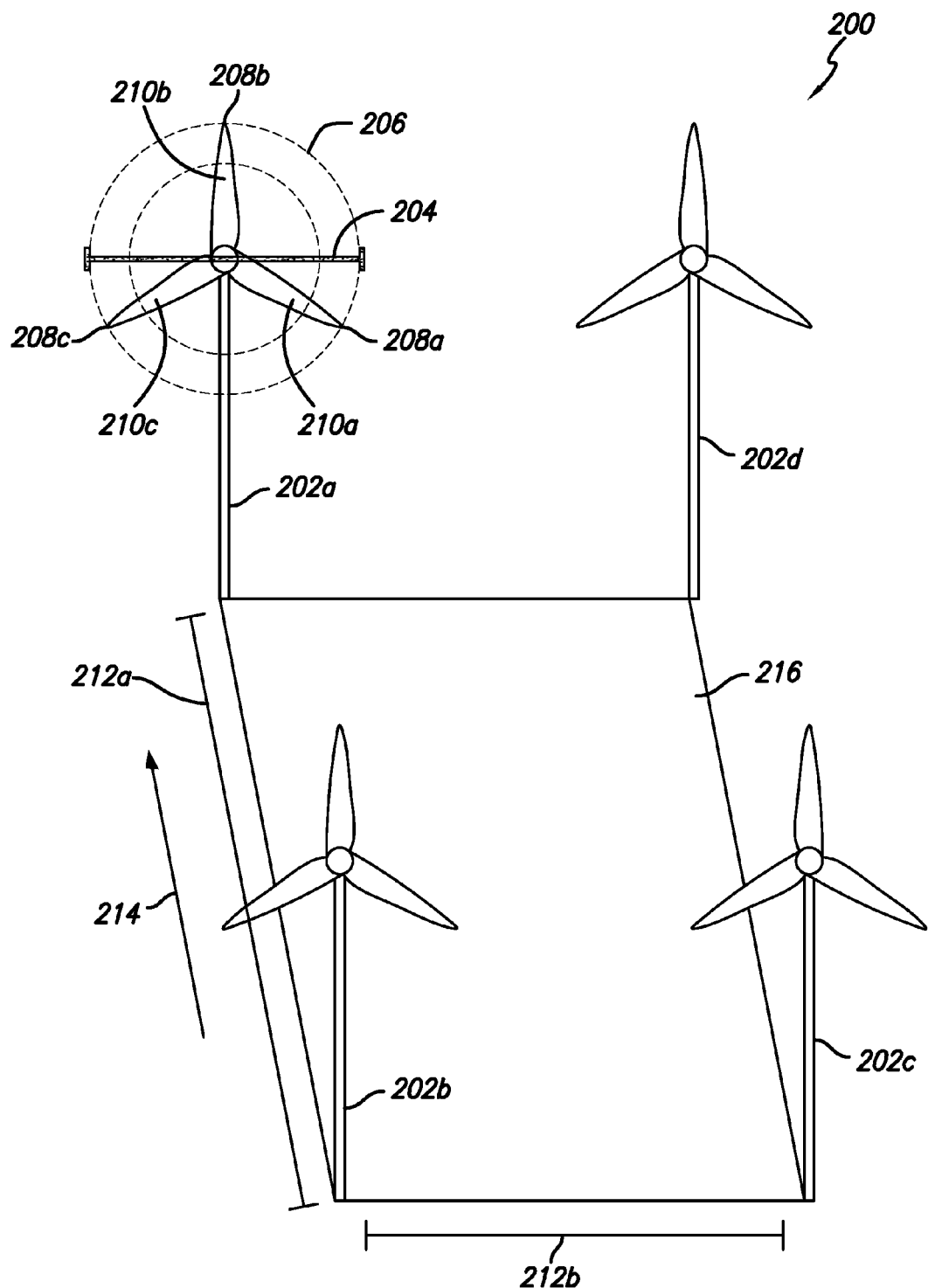
FIG. 2 is a perspective view of a conventional wind power generation installation.

FIG. 2 is a perspective view of a conventional wind-power generation installation 200 (not drawn to scale). As shown on wind turbine 202a, the measurement of a rotor diameter 204 is equal to the diameter of the circle 206 created by the outer-most tip 208a-208c of the rotor blades 210a-210c of the wind turbine 202a upon rotation. Wind turbines 202a and 202b are disposed a distance 212a that is five to ten rotor diameters apart in a direction that is parallel to the direction (represented by arrow 214) of the prevailing wind. Wind turbines 202b and 202c are disposed a distance 212b three to five rotor diameters apart in direction that is perpendicular to the direction 214 of the prevailing wind. The area 216 disposed between the wind turbines is unused ground area that is not suitable for many domestic applications due to wind turbulence and noise pollution. While agriculture is a common use of ground space beneath wind turbines, wind turbines that are disposed in non-arable locations remains unusable for agricultural purposes. It would be advantageous to be able to use the ground space around and among the wind turbines for additional power generation applications such as photovoltaic applications. Traditionally, when photovoltaic modules and wind turbines have been disposed in a single geographic location, the wind and solar apparatuses are disposed at great distances from one another or photovoltaic modules have been disposed entirely on one side (e.g. the south side) of the wind turbine installation to eliminate the chance of the wind turbines shading the photovoltaic modules.

Due to the spatial requirements indicated above, both large-scale photovoltaic installations and wind power turbine installations are typically disposed in remote locations. Wind turbines, particularly, are required to be disposed in remote locations due to noise pollution and local setback laws. It is costly and time consuming to supply transmission lines to remote locations due to requirements such as proper permits as well as factors such as material costs, labor costs, etc. Providing a combination photovoltaic and wind power generation installation would provide a way to decrease the cost and inconvenience associated with installation of new transmission lines to remote locations.

A combination photovoltaic and wind power generation installation would also allow a more continuous supply of power in comparison to the use of solely wind power installations or solely photovoltaic installations. Photovoltaic installations are only fully functional during daylight hours when the sun's rays are directed at the light-facing side of the photovoltaic arrays. This is particularly problematic in regions that experience extended periods of darkness and areas where there is seldom a direct path of sunlight to the face of the modules. Combining wind power generation sources with photovoltaic power sources would provide a steady power supply throughout the day and night. Wind tends to blow at night allowing wind turbines to supply power during periods when photovoltaic modules experience sub-optimal power generation conditions (e.g. nighttime, during hours when there is only indirect access of sunlight to the modules, during prolonged incidents of low-light such as during winter months, etc.). Likewise, photovoltaic power sources could provide supplemental power during daylight periods exhibiting little to no wind.

While conventional photovoltaic modules may not be placed around and among wind turbines due to shading effects, photovoltaic modules comprising certain embodiments of bypass diode arrays electrically coupled to photovoltaic cells would provide the necessary resistance to shading effects required to allow those modules to be installed around and among wind turbines in a single power generation installation. Such diode arrays, further described below with reference to FIGS. 4 through 9, keep photovoltaic modules and strings of modules from turning off en masse even when a single cell or an entire module is shaded.

FIG. 3 is a cross-sectional view of an example of a photovoltaic cell 300 in accordance with certain embodiments. The photovoltaic cell 300 includes a metallic substrate 302 and an absorber layer 304 is disposed over the metallic substrate 304. Any suitable semiconductor materials, such as CIGS, CIS, CdTe, CdS, ZnS, ZnO, amorphous silicon, polycrystalline silicon, crystalline silicon, etc. may be used as the absorber layer 304. As shown, the absorber layer 304 includes a p-type portion 304a and an n-type portion 304b. As a result, a pn homojunction 304c is produced in the absorber layer 304 that serves to separate charge carriers that are created by light incident on the absorber layer 304. According to various embodiments, the pn junction may be any type of pn junction, including e.g., a homojunction in a single semiconductor material or a heterojunction between two different semiconductor materials.

On the surface of the n-type portion 304b of the absorber layer is one or more transparent electrically conductive oxide (TCO) layers 306 to collect current from the absorber layer 304 for conduction to an external load. Examples of materials in TCO layers 306 include zinc oxide, ZnO, and a doped conductive oxide, such as aluminum zinc oxide (AZO) or indium tin oxide (ITO). A conductive backing layer 308 is disposed between the absorber layer 304 and the metallic substrate 302. Conductive backing layer 308 may be made of any appropriate material, e.g., molybdenum, niobium, copper, silver, etc.

FIG. 4 is a plan view of a photovoltaic array 400 including a plurality 400 of photovoltaic modules 400a, 400b and 400c, each including a set of interconnected photovoltaic cells 404 arranged in three rows. A photovoltaic module according to certain embodiments also includes one or more bypass diodes connected to one or more cells of the module such that the bypass diode will conduct electrical current if the cell(s) become damaged or shaded. For example in FIG. 4, each module includes a plurality of bypass diodes, depicted as first, second and third bypass diode assemblies 406, 408 and 410 (shown only for photovoltaic cell module 400b). Each assembly 406, 408 and 410 is aligned with a row of cells and containing a plurality of bypass diodes (not shown), with each bypass diode used to bypass current around a single cell. As discussed below with reference to FIGS. 5A-5D, a bypass diode may be used to bypass current for one or more cells arranged in various electrical connection configurations.

The depicted modules include centrally-mounted junction boxes 412a, 412b and 412c, though in other embodiments, the junction boxes may be mounted elsewhere and/or external connection boxes may be used. Busbars may be used for current collection; in FIG. 4, a first busbar 414 and a terminating busbar 416 are each electrically coupled with the first, second and third bypass diode assemblies 406, 408 and 410. Busbars 418 and 420 provide additional wiring to junction box 412b to collect current. Each junction box has two cables or connectors attached to it, each configured to form an interconnector with another module. The photovoltaic panel array may be mounted on a roof or other surface to absorb photovoltaic energy and convert it to electricity. In certain embodiments, module components including cells, bypass diodes and busbars are protected by a laminate.

Figure 5A:
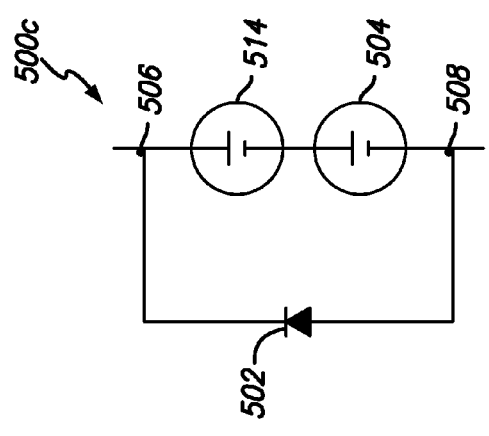
FIGS. 5A-5D are schematic diagrams of a bypass diode and photovoltaic cell configurations in accordance with various embodiments of the invention.
Figure 5B:
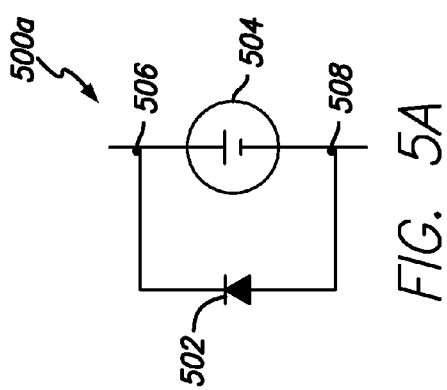
Figure 5C:
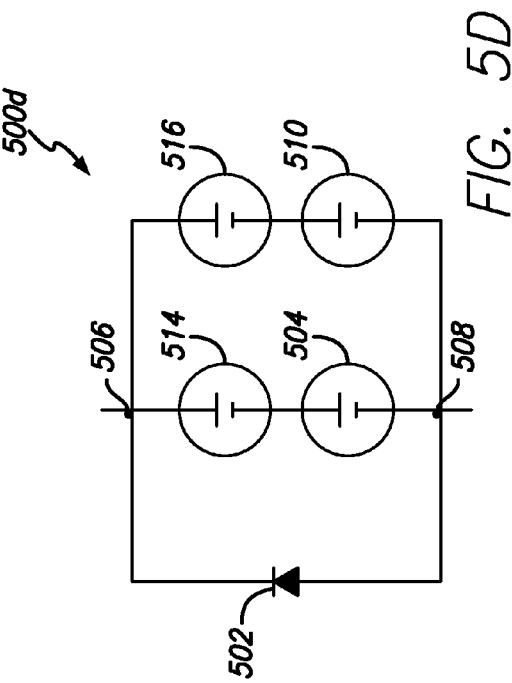
Figure 5D:
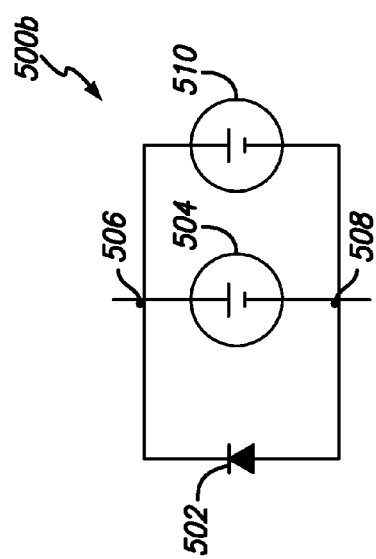

With reference now to FIGS. 5A-5D, several embodiments of the present invention are shown that illustrate examples of the manner in which a bypass diode may be electrically coupled with at least one or a plurality of photovoltaic cells. FIG. 5A shows a schematic diagram 500A of a bypass diode 502 used to bypass current around a photovoltaic cell 504 and electrically coupled in parallel with one photovoltaic cell 504 at a first terminal 506 and at a second terminal 508. To bypass current around the photovoltaic cell 504 in an event that the photovoltaic cell 504 develops a high resistance to the passage of a photovoltaic-cell module current, the bypass diode 502 is coupled to photovoltaic cell 504 with reverse polarity to that of the photovoltaic cell 504. FIG. 5B shows a schematic diagram 500B of the bypass diode 502 used to bypass current around a plurality of photovoltaic cells 504 and 510 that are electrically coupled in parallel. The bypass diode 502 is electrically coupled in parallel to the combination of photovoltaic cell 504 and a parallel photovoltaic cell 510 at first terminal 512 and at second terminal 508. FIG. 5C shows a schematic diagram 500C of the bypass diode 502 used to bypass current around a plurality of photovoltaic cells 504 and 514 that are electrically coupled in series. The bypass diode 502 is electrically coupled in parallel to the combination of photovoltaic cell 504 and photovoltaic cell 514 at first terminal 512 and at second terminal 508. To bypass current around the series combination of photovoltaic cells 504 and 514 in an event that at least one of the photovoltaic cells 504 or 514 develops a high resistance to the passage of photovoltaic-cell module current, the bypass diode 502 is coupled to the photovoltaic cells 504 and 514 with reverse polarity to both of these photovoltaic cells. In another example, FIG. 5D shows a schematic diagram 500D of a bypass diode used to bypass current around a plurality of photovoltaic cells and electrically coupled in parallel with the plurality of photovoltaic cells that are electrically coupled in series and in parallel. The bypass diode 502 is electrically coupled in parallel to the combination of photovoltaic cell 504 and photovoltaic cell 514 coupled in series with photovoltaic cell 504 and the combination of photovoltaic cell 510 and photovoltaic cell 516 coupled in series with photovoltaic cell 510. The bypass diode 502 is electrically coupled with the series/parallel combination of photovoltaic cells 504, 514, 510 and 516 at first terminal 512 and at second terminal 508. To bypass current around the series/parallel combination of photovoltaic cells 504, 514, 510 and 516 in an event that at least one of the photovoltaic cells 504, 514, 510 and 516 develops a high resistance to the passage of photovoltaic-cell module current, the bypass diode 502 is coupled to the photovoltaic cells 504, 514, 510 and 516 with reverse polarity to these photovoltaic cells. In accordance with embodiments of the present invention, a bypass diode may be configured to bypass current from a single photovoltaic cell or a plurality of photovoltaic cells including a parallel combination of any number of photovoltaic cells, a series combination of any number of photovoltaic cells and a series/parallel combination of any number photovoltaic cells. Embodiments of the present invention include a bypass diode electrically coupled in parallel with any network that includes a configuration of interconnected photovoltaic cells, in which the bypass diode serves to bypass current around the network in an event the network, or alternatively a photovoltaic cell within the network, develops high resistance to the flow of current through the photovoltaic-cell module. According to various embodiments, the bypass diode is within a photovoltaic module laminate.

Figure 6:
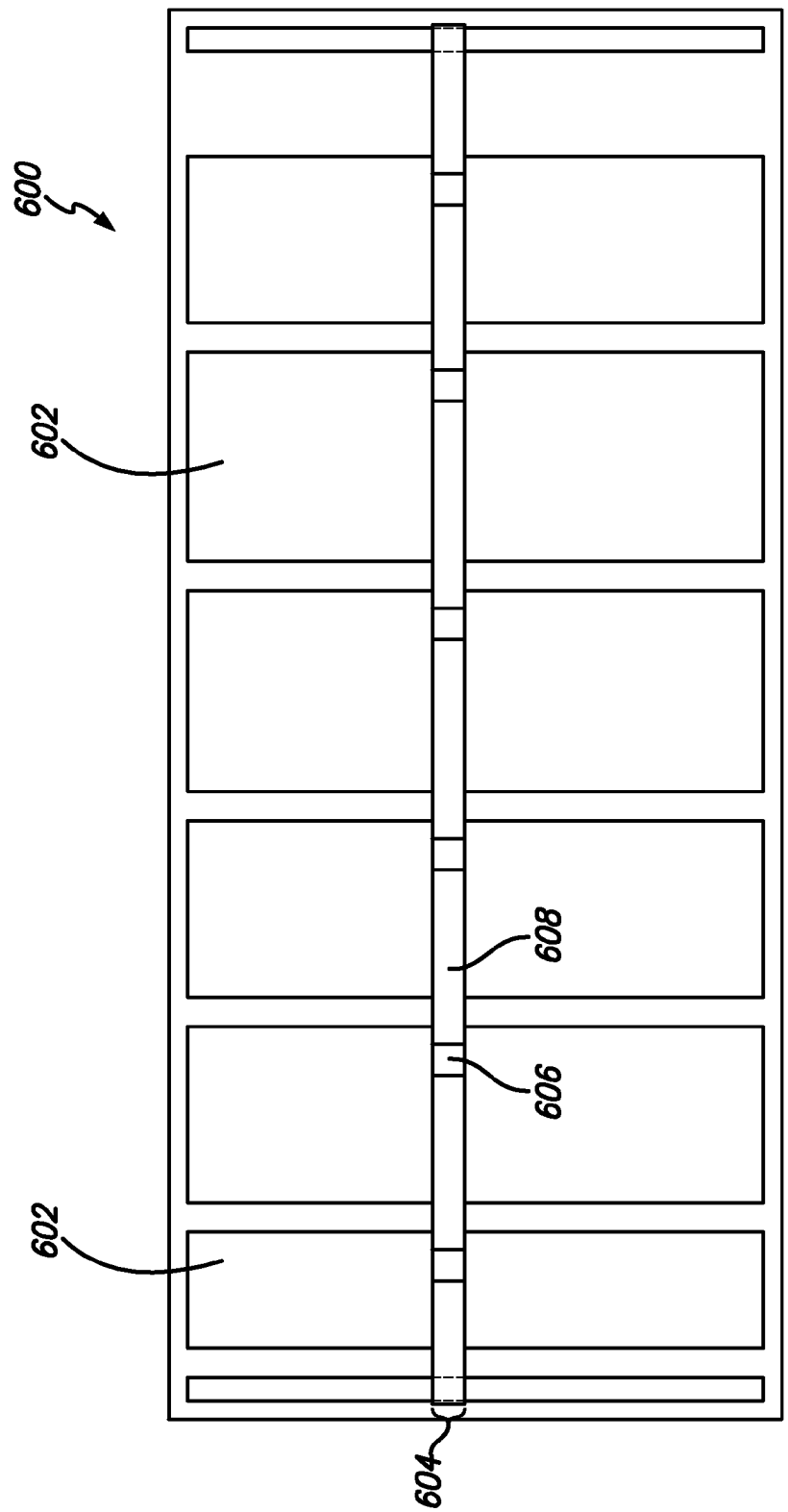
FIG. 6 is a top plan view of a photovoltaic module comprising a bypass diode array disposed on a string of photovoltaic cells in accordance with certain embodiments.

With reference now to FIG. 6, a top plan view of a photovoltaic module is shown comprising a bypass diode array electrically coupled to a plurality of photovoltaic cells in accordance with certain embodiments. Photovoltaic module 600 comprises a plurality of photovoltaic cells 602 electrically interconnected with one another and a bypass diode array 604 electrically coupled to the plurality of photovoltaic cells 602. The bypass diode array 604 comprises a plurality of bypass diodes 606 electrically connected to one another through interconnecting conductors 608. The interconnecting conductors 608 may be attached to the bypass diode 606 by soldering a leadframe of the interconnecting conductor to the bypass diode. The interconnecting conductors 608 may comprise a single strip of conductive material that makes contact with two bypass diodes 606 on its opposing ends. As discussed below with reference to FIGS. 7A-7C, interconnecting conductor may alternatively be mechanically attached to only one bypass diode and electrically interconnected with an adjacent interconnecting conductor. Alternatively, two interconnecting conductors may electrically communicate with one another through a separate conductive strip.

Figure 7A:
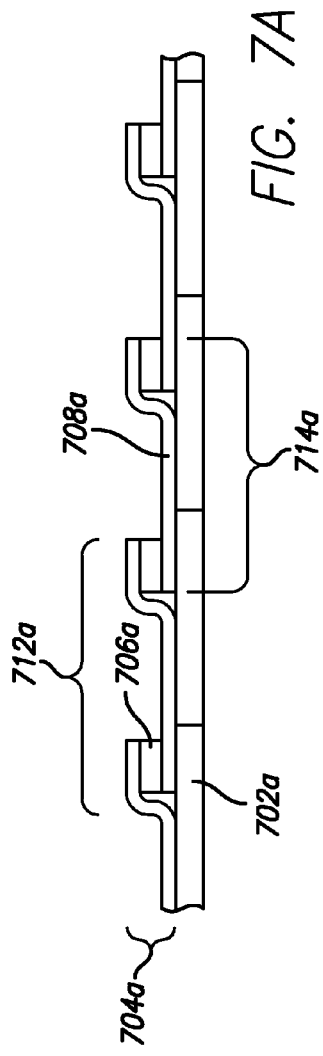
FIGS. 7A-7C are cross-sectional plan views of configurations of bypass diode arrays disposed on a plurality of photovoltaic cells in accordance with certain embodiments.
Figure 7B:
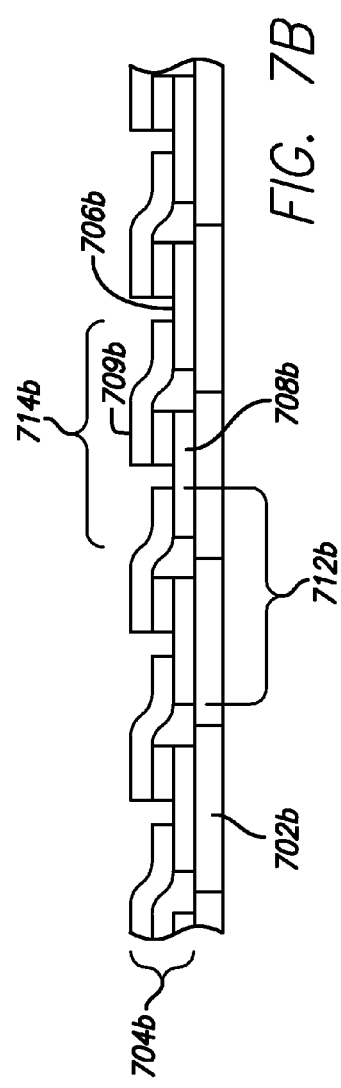
Figure 7C:
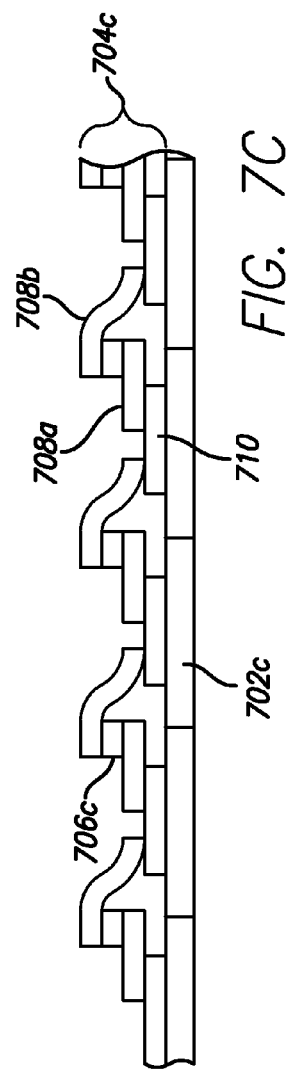

With reference now to FIGS. 7A-7C, cross-sectional plan views of several configurations of bypass diode arrays are shown in accordance with certain embodiments. FIG. 7A is a cross-sectional plan view of a bypass diode array 704a disposed on a plurality of electrically interconnected photovoltaic cells 702a in accordance with the embodiment shown in FIG. 6. As shown, the bypass diode array 704a comprises a set of bypass diode assemblies 712a, 714a each comprising a bypass diode 706a electrically coupled to an interconnecting conductor 708a. The interconnecting conductor 708a provides an electrical communication between a bypass diode 706a and an adjacent bypass diode assembly.

While the embodiment shown in FIG. 7A comprises one continuous interconnecting conductor electrically coupled to two bypass diodes it is also within the scope of the present invention that the interconnecting conductor may be mechanically attached to only one bypass diode. For example, FIG. 7B is a cross-sectional plan view of an alternative embodiment of the present invention wherein the bypass diode array 704b comprises first and second bypass diode assemblies 712b, 714b each comprising a bypass diode 706b electrically coupled to two interconnecting conductors 708b, 709b. An interconnecting conductor 709b of a first bypass diode assembly 712b is electrically coupled to an interconnecting conductor 708b of a second bypass diode assembly 714b through a direct mechanical connection.

FIG. 7C shows a cross-sectional plan view of an alternative embodiment wherein the bypass diode array 704c comprises first and second bypass diode assemblies 712c, 714c each comprising a bypass diode 706c electrically coupled to two interconnecting conductors 708c, 709c. An interconnecting conductor 709c of a first bypass diode assembly 712c is in electrical communication with an interconnecting conductor 708c of an adjacent bypass diode assembly 714c through a separate conductive strip 710.

In certain embodiments bypass diodes may comprise a custom cut, low-profile chip diced from a silicon wafer or a commercially available bypass diode. The interconnecting conductors and the separate conductive strip may comprise conductive materials such as copper which may be plated with tin or nickel. Preferably, the bypass diode and the conductive strips have similar coefficients of thermal expansion to avoid fracture of the bypass diode or the solder joint between the bypass diode and the interconnecting conductor during thermal cycling.

In certain embodiments, an interconnecting conductor may have a shape such that the interconnecting conductor acts as a heat sink, dissipating heat generated by the current that bypasses a photovoltaic cell that is experiencing high resistance. Alternatively, or in combination, the separate conductor as described above may be configured as a heat sink dissipating the heat from the interconnecting conductors.

The bypass diode array comprises at least one point of contact with at least one photovoltaic cell of the plurality of photovoltaic cells. For example, in FIG. 7c, the bypass diode array 704c is shown as contacting the plurality of cells 702c through a separate conductive strip 710. However, contact between the bypass diode array and the cell may be made through at least one bypass diode and/or at least one interconnecting conductor.

Reliable contact between the diode arrays and photovoltaic cells of a module is important for efficient operation and avoidance of shading effects. To maximize reliable contact, the electrical connection between the bypass diode array and the plurality of photovoltaic cells may be a solderless connection such as a laminated electrical connection provided by an electrically-insulating-laminate strip configured to allow access of at least one component of the bypass diode array to a photovoltaic cell through at least one access region such as a window, an opening, an aperture or a gap.

Figure 8A:
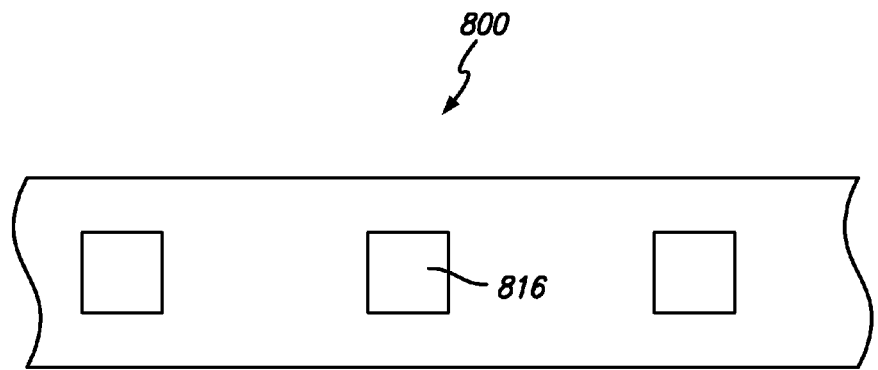
FIG. 8A is a front view of an electrically-insulating-laminate strip in accordance with certain embodiments.
Figure 8B:
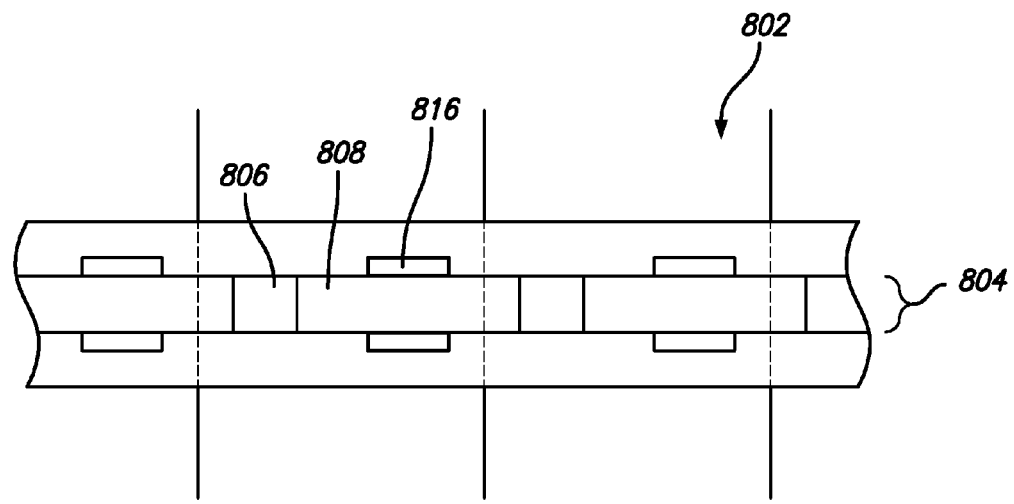
FIG. 8B is a front view of a bypass diode array electrically coupled with a plurality of photovoltaic cells through an electrically-insulating-laminate strip in accordance with certain embodiments.

With reference now to FIG. 8A, a front view of an example of an electrically-insulating-laminate strip is shown in accordance with certain embodiments. The electrically-insulating-laminate strip 800 comprises a series of access regions 816 configured to allow access of at least one component of the bypass diode array to at least one of a plurality of photovoltaic cells. FIG. 8B is a front view of a bypass diode array electrically coupled with a plurality of photovoltaic cells through an electrically-insulating-laminate strip, in accordance with that shown in FIG. 7A. The bypass diode array 804 is disposed on an electrically-insulating laminate strip 800 and electrically coupled to a plurality of photovoltaic cells 802. The series of access regions 816 of the electrically insulating laminate strip 800 allows access of interconnecting conductors 808 of the bypass diode array 804 to the plurality of photovoltaic cells 802.

The laminate strip preferably comprises a structural sheet that is able to remain substantially dimensionally stabilized under the high temperatures experienced during the module lamination process. Dimensional stabilization of the laminate strip during lamination allows reliable contact to be established between the cells and bypass diode arrays. The structural sheet may comprise thermoplastic materials selected from a group comprising polyethylene terephthalate (PET), poly(methyl methacrylate) (PMMA), fluorinated ethylene propylene (TEP), ethylene tetrafluoroethylene (ETFE), polycarbonate, polyimide and polyetherketone (PEEK). For example, the structural sheet may comprise PET which has a melting point of 250° C., which is well above the standard processing temperatures experienced during module lamination, such as about 120° C. for example. The structural sheet could further optionally be covered on one side or both sides by an adhesive-type layer allowing the electrically-insulating-laminate strip to adhere to both the photovoltaic cells as well as the bypass diode array without requiring solder, welding, or conductive adhesive; only mechanical pressure is required. This adhesive-type layer may comprise polymeric materials such as low density polyethylene, low density urethane, or low density polymer (with ionomer functionality), poly(ethylene-co-methacrylic acid) (Surlyn™). Alternatively, or in combination, the adhesive-type layer may comprise non-polymeric adhesive materials such as silicone-based polymer, e.g. the following materials available from Dow Corning in Midland, Mich.: silicone adhesives/encapsulants, two part translucent heat cure adhesive (part number SE 1700), two part fast cure low modulus part number JCR 6115; JCR 6140. In some embodiments the adhesive materials may include thermoset polymer materials such as polyurethanes, epoxies, silicones, acrylics and/or combinations thereof. In a specific embodiment, the structural sheet comprises polyethylene terephthalate (PET) and the adhesive-type layer comprises poly(ethylene-co-methacrylic acid), Depending on the embodiment, a primer may be disposed on the structural sheet between the structural sheet and the adhesive-type layer to improve the bonding between the structural sheet and the adhesive-type layer. While a solderless connection has been described above, it should be recognized that it is within the scope of the present invention that the connection between the bypass diode array and the plurality of photovoltaic cells may be made using solder, welding, or a conductive adhesive.

Figure 9A:
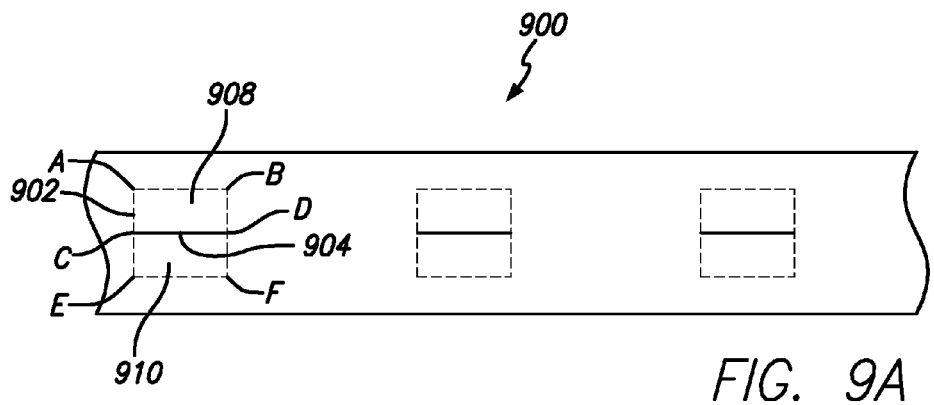
FIG. 9A is a front view of an alternative embodiment of an electrically-insulating-laminate strip.

The interconnecting conductors are typically connected to the bypass diodes using solder joints. In certain embodiments, the electrically-insulating-laminate strip may provide a solder-free, slidable connection between components of the diode array such as between interconnecting conductors of adjacent diode assemblies and/or between the interconnecting conductor and a separate conductive strip, depending on the embodiment. FIG. 9A shows a front view of an electrically-insulating-laminate strip 900 with H-cut access regions configured to provide access by the bypass diode array to the plurality of photovoltaic cells and to provide a solder-free, slidable connection in accordance with certain embodiments. As shown, an electrically-insulating-laminate strip 900 is provided with an aperture formed by three cuts: cut 902 represented by line AE, cut 904 represented by line CD, and cut 906 represented by line BF. The flaps 908, 910 created by the cuts may be folded back along dotted lines AB and EF respectively.

Figure 9B:
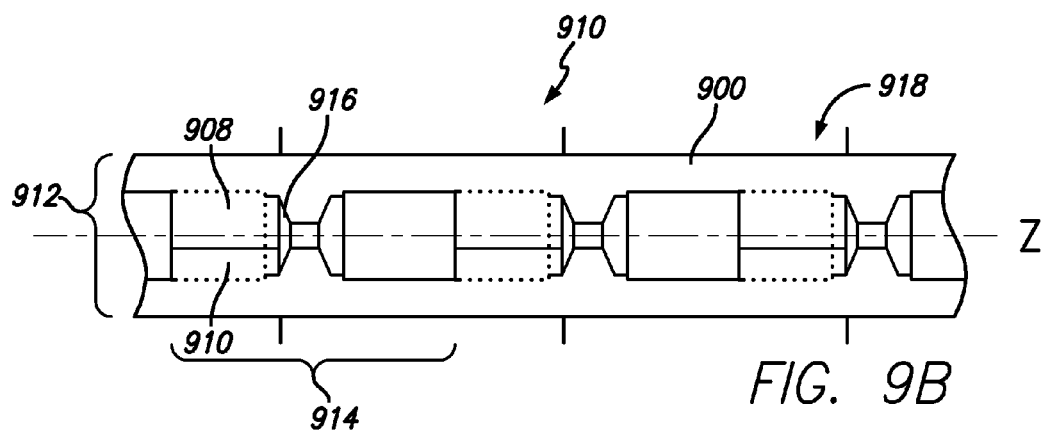
FIG. 9B is a front view of a bypass diode array electrically coupled with a plurality of photovoltaic cells through an alternative embodiment of an electrically-insulating-laminate strip.

With reference now to FIG. 9B, a front view of a diode array electrically connected with a plurality of photovoltaic cells through an alternative embodiment of an electrically-insulating-laminate strip is shown. An example embodiment of a diode array 912 is shown disposed on an electrically-insulating-laminate strip 900 wherein an interconnecting conductor 916 of each diode assembly 914 is allowed access to the underlying photovoltaic cells 918 through an aperture created by the flaps 908, 910 of the electrically-insulating-laminate strip 900.

Figure 9C:
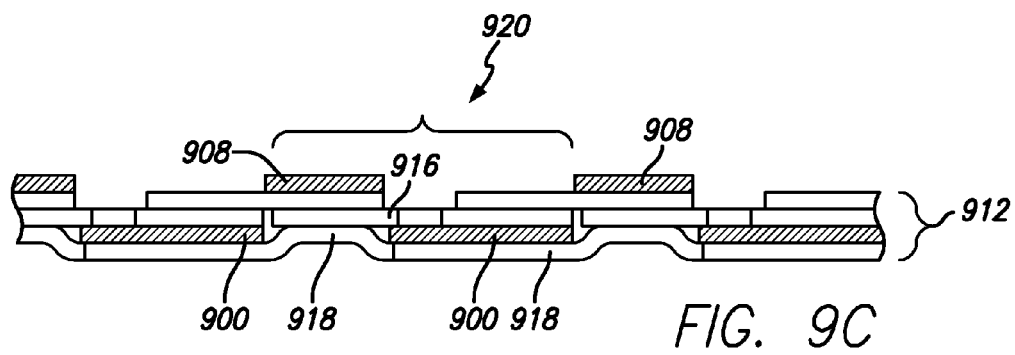
FIG. 9C is a cross-sectional view of a bypass diode array electrically coupled with a plurality of photovoltaic cells through an alternative embodiment of an electrically-insulating-laminate strip.

With reference now to FIG. 9C, a cross-sectional view of a bypass diode array electrically coupled with a plurality of photovoltaic cells through an electrically-insulating-laminate strip is shown taken along line Z of FIG. 9b. One embodiment of a diode array 912 is shown disposed on an electrically-insulating-laminate strip 900 wherein an interconnecting conductor 916 of each diode assembly 914 is allowed access to the underlying photovoltaic cells 918 through an aperture created by the flaps 908, 910 of the electrically-insulating-laminate strip 900.

The solder-free, slidable contact established between the interconnecting conductors and between the interconnecting conductor and separate conductive strip allows these components to expand and contract during thermal cycling with a lower risk of losing contact compared to configurations that use solder joints. The slidable contact also decreases the likelihood of breakage of the solder joint between the interconnecting conductors and the bypass diode and the risk of breakage of the bypass diode itself due to lower strain in the diode assembly.

The bypass diode array is preferably disposed on the side of the plurality of cells opposite the light-facing side of the plurality of cells to avoid obstruction of the path of light to the cells. However, it is within the scope of the present invention for the bypass diode array to be disposed on the light-facing side of the plurality of photovoltaic cells.

To further decrease the affects of shading of photovoltaic arrays, in certain embodiments each photovoltaic module in a photovoltaic array may be equipped with a microinverter. The use of microinverters allows power to be transferred in the form of AC power and also allows an entire module to be shaded while not affecting the other modules in the series, making the photovoltaic arrays more resistant to shading effects. In other certain embodiments, there may be one inverter for a string of modules, such as an entire array (e.g. a small string inverter). Alternatively, each module or a string of modules may be equipped with a DC/DC converter allowing an entire module to be shaded while not affecting the other modules in the series.

Figure 10B:
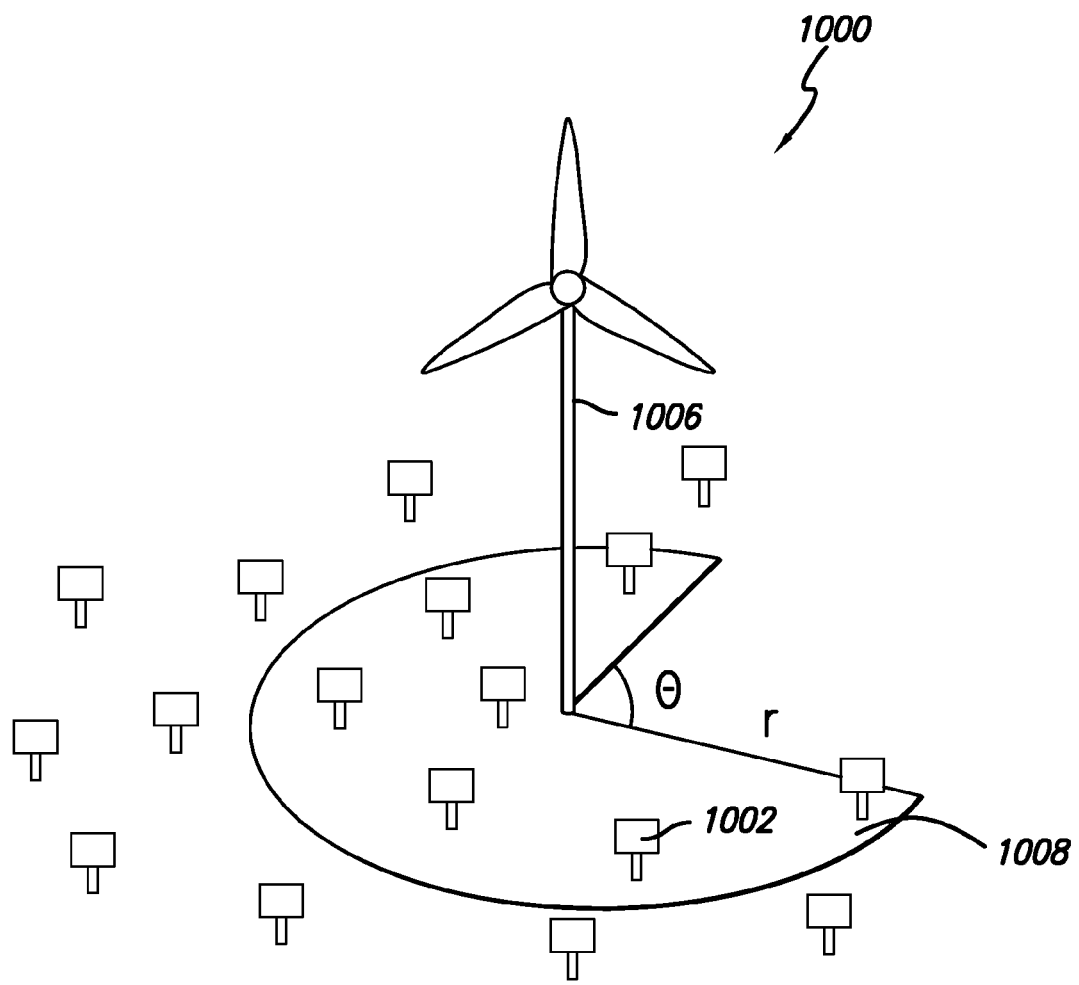
FIG. 10B is a perspective plan view of a combination photovoltaic and wind power generation installation.

The bypass diode array configurations described above keep the photovoltaic modules as well as strings of photovoltaic modules from turning off en masse even when a single cell or an entire panel is shaded, rendering it possible to combine such modules with wind turbines in a combination photovoltaic and wind power generation installation as described below. FIG. 10 is a perspective view of a combination photovoltaic and wind power generation installation 1000 in accordance with certain embodiments. As shown, a plurality of photovoltaic arrays 1002 are disposed such that the plurality of photovoltaic arrays 1002a is at least partially shaded a portion of the day by the shadow 1004 cast by the wind turbine 1006. Photovoltaic arrays may be disposed in close proximity to the wind turbines, such as within one to five hundred feet, or such as one to one hundred feet, or one to fifty feet. Now with reference to FIG. 10B, the photovoltaic arrays 1002 may be disposed in an arc area 1008 defined by an angle ($\Theta$) between 270° and 360° and a radius (r) between one and 500 feet, such as one and 100 feet, or even one and 50 feet (see FIG. 10B).

The photovoltaic arrays may further comprise solar tracking mechanisms capable of tracking the position of the sun throughout the day and over the year for maximum light absorption on the light-incident side of the photovoltaic cells. Solar tracking mechanism may comprise a sensor and a servo motor. The wind turbines may further be equipped with wind tracking mechanisms such as a weather vane or a sensor coupled with a servo motor.

Photovoltaic arrays and wind turbines of the combination photovoltaic and wind power generation installation may be connected to the same or adjacent transmission lines to direct power to the electric power transmission network. While transmission lines primarily transmit high voltage alternating current (AC), high voltage direct current (DC) may be transmitted over very long distance transmission lines (e.g. transmission lines >400 mi.). Most large-scale wind turbines produce AC power while photovoltaic arrays produce DC power. Therefore, in configurations in which both power sources channel power to the same transmission lines, electrical conversion mechanisms may be employed.

If AC power is desired, photovoltaic arrays may comprise DC/AC conversion circuitry such as the microinverters or small string inverters described above. Alternatively, a single inverter could be used for a plurality of arrays or a single inverter may be used for an entire installation. Alternatively, a grid-tie inverter may be used for the photovoltaic installation. The DC/AC conversion circuitry may be incorporated as part of the photovoltaic arrays or employed as a separate component disposed between the photovoltaic arrays and the transmission lines. The combination photovoltaic and wind power generation installation may further employ a transformer that converts the AC output to a voltage level that is congruous with the installation requirements.

If DC power is desired for transmission, the wind turbines may comprise current rectifiers converting the generated AC power to DC power, which may further allow the power generated by the wind turbines to be transmitted through the same transmission lines as inverterless photovoltaic arrays. Current rectifiers may be incorporated as part of the wind turbines or may be a separate component disposed between the wind turbine and the transmission line. The photovoltaic arrays may further be associated with at least one DC/DC converter to allow the output of the photovoltaic arrays to be changed to a desired voltage level. It should be noted that while power generated by the photovoltaic arrays and the wind turbines may both be transmitted through the same transmission lines, power generated by each may alternatively be transmitted through separate transmission lines.

Figure 11:
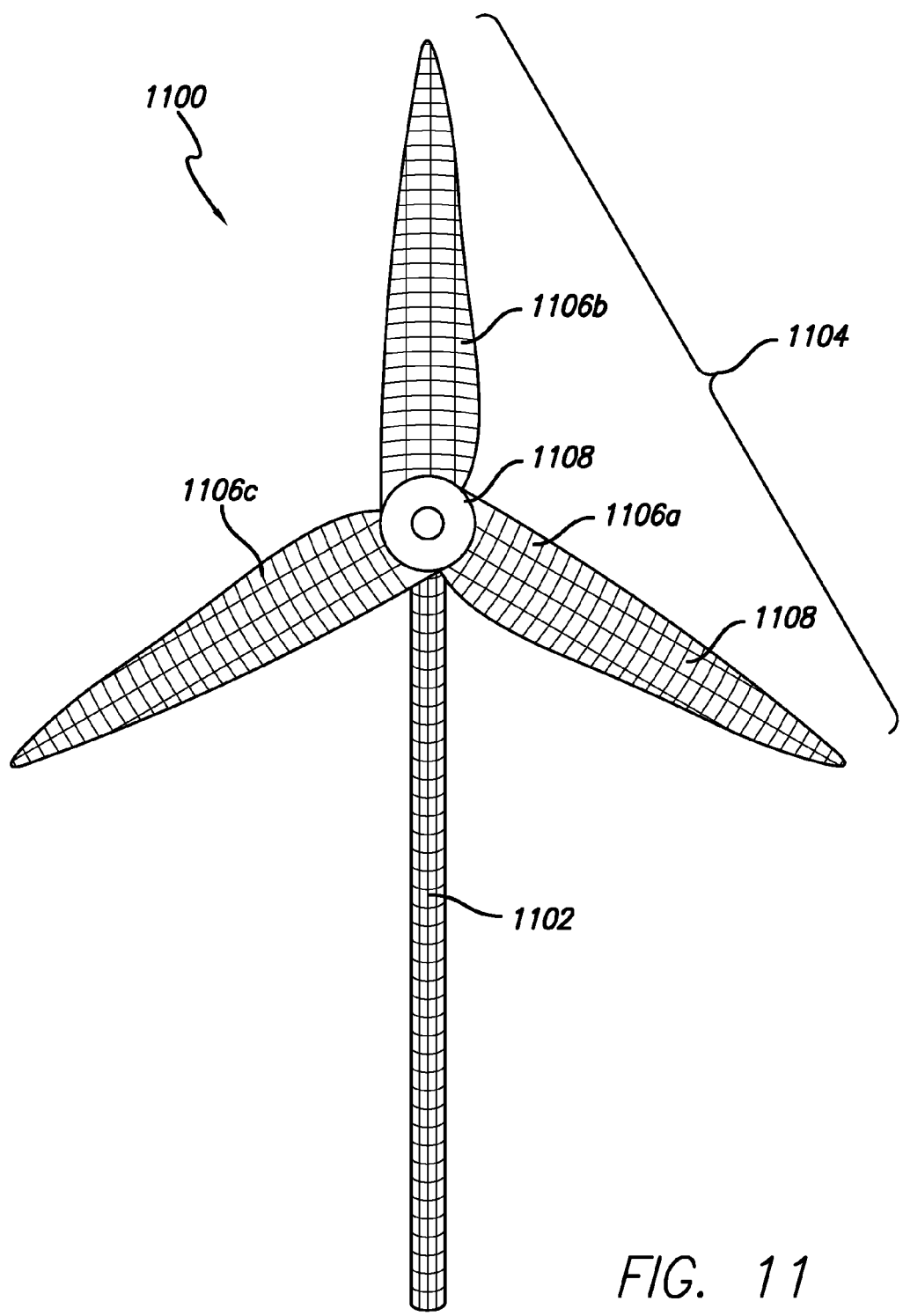
FIG. 11 is a front view of a wind turbine substantially covered with flexible interconnected photovoltaic cells in accordance with certain embodiments.

To further increase the power output of a combination photovoltaic and wind power generation installation, flexible photovoltaic cells may cover the shaft, hub and the blades of the wind turbine. FIG. 11 is a front view of a wind turbine with flexible interconnected photovoltaic cells disposed thereon in accordance with certain embodiments. The wind turbine 1100 comprises a shaft portion 1102 and a rotor portion 1104 further comprising rotor blades 1106*a-c* and a hub 1108. The shaft portion 1102, the hub 1108 and/or the rotor blades 1106*a-c* may be covered in flexible interconnected photovoltaic cells 1108 configured to collect photovoltaic energy.

The flexible photovoltaic cells may further be coupled to DC/AC or DC/DC conversion circuitry which may be incorporated into the flexible photovoltaic cells, into the wind turbine or may be a separate component disposed between the flexible cell-covered wind turbine and a transmission line. The generated power may be transmitted to the same or a different transmission line as the wind turbine and/or the same or a different transmission line as the photovoltaic arrays depending on preference and the form of the output power.

While the present invention has been described with reference to preferred embodiments, those skilled in the art will recognize that changes may be made in form and detail without departing from the spirit and scope of the invention.

What is claimed is:

1. A combination photovoltaic and wind power generation installation comprising:
   at least one wind turbine configured to generate power;
   a plurality of photovoltaic arrays comprising at least one photovoltaic module and configured to generate power, wherein the plurality of photovoltaic arrays is at least partially shaded a portion of the day by a shadow cast by the at least one wind turbine; and
   wherein each photovoltaic module comprises a plurality of photovoltaic cells, at least one bypass diode array electrically coupled to the plurality of photovoltaic cells and configured to bypass current flow around at least one photovoltaic cell; and
   wherein the at least one diode array comprises an electrically-insulating-laminate strip configured to allow access of at least one component of a bypass diode assembly to a photovoltaic cell of the plurality of photovoltaic cells, the electrically-insulating laminate strip comprising an access region through which the at least one component of the bypass diode assembly electrically couples with said photovoltaic cell; and
   wherein the electrically-insulating-laminate strip comprises a structural sheet and at least one adhesive-type layer.

2. A method of operating a combination photovoltaic and wind power generation installation, comprising:
   providing at least one wind turbine configured to generate power;
   providing a plurality of photovoltaic arrays comprising at least one photovoltaic module and configured to generate power;
   wherein the at least one photovoltaic module comprises a plurality of photovoltaic cells and at least one bypass diode array electrically coupled to the plurality of photovoltaic cells and configured to bypass current flow around at least one photovoltaic cell; and
   wherein the at least one bypass diode array comprises an electrically-insulating-laminate strip configured to allow access of at least one component of a bypass diode assembly to a photovoltaic cell of the plurality of photovoltaic cells, the electrically-insulating laminate strip comprising an access region through which the at least one component of the bypass diode assembly electrically couples with said photovoltaic cell wherein the electrically-insulating-laminate strip comprises a structural sheet and at least one adhesive-type layer; and
   installing the photovoltaic arrays such that the plurality of photovoltaic arrays are at least partially shaded a portion of the day by a shadow cast by the at least one wind turbine.

\* \* \* \* \*